Patented Nov. 4, 1941

2,261,451

UNITED STATES PATENT OFFICE 2,261,451

COLORED WAX COMPOSITION AND
PROCESS FOR PRODUCING THE SAME

Wayne A. Proell, Chicago, Ill., assignor to Standard Oil Company, Chicago, Ill., a corporation of Indiana No Drawing. Application December 12, 1939,
Serial No. 308,887

5 Claims. (Cl. 44—7.5)

This invention relates to colored wax compositions and to a method of producing the same. More particularly, it relates to paraffin wax compositions colored with a new series of dyes. Still more particularly, it relates to paraffin wax candles colored with a new series of dyes and to a method for producing them.

In order to be satisfactory as a dye for paraffin wax compositions, particularly candles, the dye must not only have good coloring power but it must have a substantial solubility in paraffin wax compositions. In addition, it should not fade under the action of sunlight over reasonable periods and should be resistant to the action of moderately high temperatures of the order of 250° F., i. e., when heated to such temperatures it should not fade and it should not separate out of solution in large aggregates or crystals either while hot or after cooling. Large numbers of dyes have been used heretofore for coloring paraffin wax compositions but very few have been found which satisfactorily combine the properties just enumerated. This is particularly true of pink dyes.

It is, therefore, an object of this invention to provide a new series of dyes for paraffin wax compositions which have a substantial solubility in such compositions and which possess resistance to the action of sunlight and of moderately high temperatures. Another object is to provide a new series of dyes for paraffin wax compositions. Still another object is to provide paraffin wax compositions particularly candles, which are colored with these new dyes. A more specific object is to provide an improved pink dye for paraffin wax compositions and to produce candles dyed with this dye. Another object is to provide dyes of the type mentioned which have a very high coloring power. Other objects will appear hereinafter.

It has now been found that these objects may be accomplished by incorporating into paraffin wax compositions as dyes, metal organic dyes soluble in such compositions, such as colored metal oximes which have a substantial solubility in paraffin wax compositions, particularly metal alkyl glyoximes, such as metal dimethyl, diethyl and the like, glyoximes. Preferably, the metal in the metal organic compound, particularly in the metal oximes will be a heavy metal for example, nickel or cobalt. Paraffin wax compositions dyed with metal organic dyes, particularly nickel dimethylglyoxime, have, as is shown more particularly hereinafter, both a high resistance to the action of sunlight and a good resistance to moderately high temperatures. By metal organic dyes which have a substantial solubility in paraffin wax compositions is meant not only those which dissolve readily in a substantial amount at ordinary temperatures but also those which dissolve readily when heated to moderately high temperatures and which on cooling thereafter to ordinary temperatures do not separate in the form of large aggregates or crystals.

In order that the invention may be better understood, the following specific examples are included. These examples, however, are intended to be construed as illustrative only and not as limiting the scope of the invention.

*Example I.*—A paraffin wax stearic acid mixture containing 25% stearic acid was heated to 250° F. and 0.005% of nickel dimethylglyoxime and 0.01% of dimethylglyoxime was added. The dimethylglyoxime dissolved rapidly to form a yellow solution. This solution was filtered and chilled to just above the melting point without any deposition of dye. Cakes of wax cast from this solution remained colorless until they had cooled considerably below the melting point of the wax. After this, a pink color developed. This cake had the same intensity of color as the standard shell pink wax prepared in the same manner as the nickel dimethylglyoxime dyed wax cake described above except that .02% Rhodamine B dye was used in place of the 0.005% of the nickel compound and the .01% of the oxime. The tint was slightly more violet than the shell pink—a rose-quartz hue. Another orthodox dye being tested at the same time—Calco Candle Fast Red T—also required 0.020% solution to produce the same depth of color.

It is desirable, as indicated in the above example, to heat the paraffin wax composition to about 250° F. before adding the dye since at temperatures only slightly above the melting point of the wax base the dye dissolves slowly and seems to disperse into colloidal suspension. It is within the scope of the invention, however, to dissolve the dye at any temperature at which it will dissolve instead of dispersing. It is also curious to note that although the wax cakes containing the dye do not exhibit any appreciable color until cooled considerably below the melting point of the wax, if they are thereafter again heated up to 120 to 130° F. the pink color does not disappear. The color apparently is due to an irreversible precipitation of dye in very finely divided form from supersaturated solid solution although it is not intended that the invention shall be limited to this theory. It is believed that by reason of this latter phenomenon, the mechanical strength of the wax is markedly increased. The necessity for heating the wax to about 250° F. in order to secure a homogeneous solution may be avoided by dissolving nickel stearate in the paraffin wax base and adding a solution of dimethylglyoxime in melted paraffin to the mixture. It may be noted that nickel dimethylglyoxime dissolves in either pure paraffin wax or pure stearic acid.

To determine the stability to light of the wax compositions dyed as described above with nickel dimethylglyoxime, cakes of this composition were compared with similar cakes containing 0.020% of Calco Candle Fast Red T and the standard shell pink dye respectively, instead of the nickel dye, after exposure to bright summer sunshine for three hours both the standard and Calco dye had faded markedly and, at the end of one day, these two were bleached almost white. On the other hand, even after a whole day's exposure the cakes dyed with nickel dimethylglyoxime were exactly the same color as controls which were kept in the dark. No perceptible fading had occurred.

Heat resistance was also checked by comparing the nickel dimethylglyoxime dyed wax cakes with the standard shell pin wax cakes. The test cakes for this purpose were heated at 250° F. for two hours and then compared with controls. The standard dye was badly faded to a near white and while the nickel dyed cakes were also faded they showed much less fading than did the standard. The dimethylglyoxime added as described in the above example serves to give the wax composition dyed with nickel dimethylglyoxime increased resistance to heat. It has also been found that if dimethylglyoxime is added to paraffin wax compositions containing nickel dimethylglyoxime which have been subjected to the action of heat until appreciable fading occurred, the pink color is restored. The nickel dimethylglyoxime compositions also exhibited no tendency toward segregation or settling of the dye even when long tubes of the dyed wax were slowly cooled. The color was always uniformly dispersed.

*Example II.*—In a similar manner, cobalt dimethylglyoxime was dissolved in a paraffin stearic acid wax composition. The resulting wax cake had a tan color but otherwise showed properties similar to that dyed with nickel dimethylglyoxime.

Instead of the paraffin wax compositions described above, other paraffin wax compositions may be used. The invention is, however, particularly applicable to paraffin wax compositions suitable for making candles. The amount of metal organic dye to be incorporated in the wax will, of course, depend upon the coloring power of the particular dye and upon the intensity of color desired in the final product. The quantity necessary in any particular case may be readily determined by those skilled in the art. Other methods of introducing dye into the paraffin wax compositions than those described above may also be used. It will be apparent, however, that in order to produce a homogeneous color in the product the method employed should be such that the dye is uniformly dissolved in the paraffin wax composition. After the wax composition has been prepared if candles are to be prepared from it, they may then be cast according to any desired method.

In a manner similar to that illustrated above for nickel dimethylglyoximes, the corresponding organic compound without a metal in it may be added to the wax compositions in addition to the metal organic dye to give increased resistance to heat or the corresponding compound may be added after exposure to heat to restore the color. Thus in the case of a metal oxime the corresponding oxime would be added. The quantity necessary will vary depending upon the molecular weight of the compound, etc. but may be readily determined in a given case by those skilled in the art. The quantity employed in the above examples will serve as a guide.

The advantages of the present invention are believed to be apparent from what has been disclosed above. The metal organic dyes, particularly the metal oximes appear to possess strong tinctorial properties comparing favorably with the usual organic dyes in this respect and, at the same time, being immensely superior in resistance to the deteriorating effect of light as evidenced by the data given above with respect to nickel dimethylglyoxime. A noteworthy advantage of this latter dye is that it solves a particularly difficult problem in providing a light fast pink dye. The heat stability of the metal organic dyes in wax compositions although not as outstanding as their fastness to light, is still very good compared with the usual organic dyes employed in paraffin wax compositions.

It has also been found that metallic salts of 8-hydroxyquinoline, for example, the bismuth and ferric salts, dissolve readily in paraffin wax compositions and give intense colors, the bismuth salt producing a lemon yellow color and the ferric salt a deep brown. Other metal organic compounds such as metal salts of alpha-nitroso-beta-naphthol, are further examples of compounds suitable for use as dyes in paraffin wax compositions. The cobalt derivative of this latter compound gave a dull orange color and the iron alpha nitroso beta-naphthol gave a pale tan color to the wax. It will be obvious, therefore, that not only the metal oximes, particularly the heavy metal alkyl glyoximes, but that various other organic compounds as well are suitable for use as dyes for paraffin wax compositions.

It is apparent that many widely different embodiments of this invention may be made without departing from the spirit and scope thereof and, therefore, it is not intended to be limited except as indicated in the appended claims.

I claim:

1. A colored solid candle wax composition comprising paraffin wax and a dye consisting of a small amount of a heavy metal alkyl glyoxime and a stabilizer consisting of an unsubstituted alkyl glyoxime dissolved in said wax, said color being stable to sunlight and moderately high temperatures.

2. A solid pink candle wax composition comprising paraffin wax and a dye consisting of a small amount of nickel dimethylglyoxime and a stabilizer consisting of an unsubstituted dimethylglyoxime dissolved in said wax, said pink color being stable to sunlight and moderately high temperatures.

3. A solid pink candle wax composition comprising paraffin wax and a dye consisting of about 0.005% of nickel dimethylglyoxime and about 0.01% of a stabilizer consisting of an unsubstituted dimethyl glyoxime dissolved in said wax, said pink color being stable to sunlight and moderately high temperatures.

4. A method for preparing pink candles comprising the steps of heating a candle wax substantially above its melting point, dissolving therein a small amount of nickel dimethylglyoxime and a small amount of a stabilizer consisting of dimethylglyoxime, and cooling said candle wax substantially below the melting point to irreversibly precipitate the dye in very finely divided form from supersaturated solid solution whereby a pink candle wax stable to heat and light is obtained.

5. A method for preparing pink candles comprising the steps of heating a candle wax substantially above its melting point, dissolving therein about 0.005% of nickel dimethylglyoxime and about 0.01% of a stabilizer consisting of dimethylglyoxime, and cooling said candle wax substantially below the melting point to irreversibly precipitate the dye in very finely divided form from supersaturated solid solution whereby a pink candle wax stable to heat and light is obtained.

WAYNE A. PROELL.